United States Patent [19]

Wang et al.

[11] Patent Number: 4,562,246

[45] Date of Patent: Dec. 31, 1985

[54] ESSENTIALLY LINEAR, THERMOPLASTIC POLY (AMINO-S-TRIAZINES)S AND PROCESS FOR THE PRODUCTION THEREOF

[75] Inventors: David W. Wang, Trumbull; Michael M. Fisher, Ridgefield; Walter M. Thomas, Darien, all of Conn.

[73] Assignee: American Cyanamid Company, Me.

[21] Appl. No.: 589,859

[22] Filed: Mar. 16, 1984

Related U.S. Application Data

[62] Division of Ser. No. 366,748, Apr. 8, 1982, abandoned.

[51] Int. Cl.$^4$ .............................................. C08G 73/06
[52] U.S. Cl. ..................................... 528/423; 528/401
[58] Field of Search ................................. 528/423, 401

[56] References Cited

U.S. PATENT DOCUMENTS

| | | | |
|---|---|---|---|
| 3,308,101 | 3/1967 | Ireda | 528/423 |
| 3,309,345 | 3/1967 | Lutwack | 528/423 |
| 4,086,204 | 4/1978 | Cassandrini et al. | 528/423 |

FOREIGN PATENT DOCUMENTS

| | | |
|---|---|---|
| 7237265 | 9/1972 | Japan . |
| 905609 | 9/1962 | United Kingdom . |
| 963812 | 7/1964 | United Kingdom . |
| 253352 | 4/1970 | U.S.S.R. . |

OTHER PUBLICATIONS

Nunes et al., Polym. Eng. Sci., 22, 4, (1982).
Wang et al., Journ. of Polymer Sci. pp. 1–7.

*Primary Examiner*—Harold D. Anderson
*Attorney, Agent, or Firm*—John W. Cornell

[57] ABSTRACT

High molecular weight, essentially linear, thermoplastic amino-s-triazine resins having an inherent viscosity of at least about 0.55 dl./g. are disclosed, comprising recurring units of the formula:

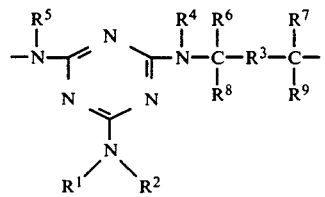

containing not less than 25 wt. % of triamino-s-triazine units of the formula:

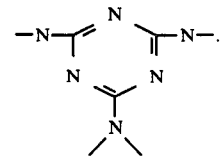

Such resins are suitable for molding or extrusion into films, fibers and filaments and for preparation of composite materials.

Also disclosed is a process for the production of high molecular weight essentially linear, thermoplastic amino-s-triazine resins which comprises reacting, in contact with water, an inert, water-immiscible organic solvent for at least one of the reactants and a basic acid acceptor, substantially equimolar proportions of a triazine compound or a mixture of triazine compounds of the formula:

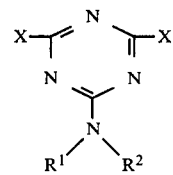

with a diamine or a mixture of diamines of the formula:

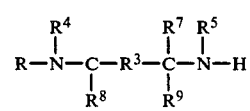

until a thermoplastic amino-s-triazine resin having an inherent viscosity of at least about 0.55 dl/g., is produced.

24 Claims, No Drawings

ESSENTIALLY LINEAR, THERMOPLASTIC POLY(AMINO-S-TRIAZINES)S AND PROCESS FOR THE PRODUCTION THEREOF

This application is a division of application Ser. No. 366,748, filed Apr. 8, 1982, now abandoned.

This invention relates to new high molecular weight thermoplastic poly(amino-s-triazine)s prepared using a novel two-phase polymerization process. More particularly, the present invention relates to novel polymers and processes in which high molecular weight thermoplastic resins are derived from substituted or unsubstituted amino-dihalo-1,3,5-triazines and diamines.

BACKGROUND OF THE INVENTION

The polymers and processes for preparing the same are distinct from the prior art. While it is known to prepare polymers by reaction of substituted or unsubstituted 2-amino-4,6-dihalo-s-triazines with various diamines in organic solvents, the products obtained have no technical importance on account of their low molecular weight. In Millot et al., Bull. Soc. Chim. Fr. (5–6, Pt. 2) 1380 (1975), a high temperature solution condensation process resulted in polymers having a molecular weight of less than 8,000. Another such example is found in U.S.S.R. Pat. No. 197,163 (1967): poly(hexamethylene melamine) and poly(p-phenylene melamine) were prepared with reduced viscosities of less than 0.2 dl/g/measured in dimethylsulfoxide and conc. sulfuric acid, respectively.

Other methods are described in Audebert et al., Chem. Abstr. 72:121995y (1970); Kutepov et al., Chem. Abstr. 74, 142398n; Kutepov et al., Chem. Abstr. 73:45897w; U.S.S.R. Pat. No. 246,839 (1969); U.S.S.R. Pat. No. 253,352 (1969); and U.S. Pat. No. 4,086,204 (1978). In order to increase the solubility of poly(amino-s-triazine)s to facilitate the solution condensation process, many of these previously reported polymers were designed to be highly substituted on the exocyclic amino groups and have large diamine linking units. Because of this, they also contained low concentrations—much less than 25 wt.%—of melamine structural units, in the polymer backbone. Although no mechanical property data are given, it is well known that physical properties, especially thermal and mechanical properties, are closely related to the molecular weight and/or the polymer structure, improving in general with increasing molecular weight. Methods other than the direct condensation of aminodihalo-s-triazines with diamines also are known. In U.S. Pat. No. 3,308,101, the products are not true thermoplastic materials, and, in R. Audebert, Chem. Abstr. 71:22355n, cyanuric chloride was reacted with tetramethylenediamine followed by piperidine, but gave a product with an inherent viscosity of only 0.15 dl./g. measured at 0.5% in concentrated sulfuric acid. The foregoing patents and publications are incorporated herein by reference.

In contrast with the products of the prior art processes, which have properties which render them of no practical importance as plastics, it has now been discovered that such products can be produced according to the present invention in forms which are essentially linear, high molecular weight, i.e., an inherent viscosity of at least 0.55 dl./g. and with an triamino-s-triazine unit content of at least 25 weight percent.

The novel, high molecular weight, linear poly(alkylenemelamine) resins of the present invention exhibit high tensile and flexural modulus, good burn resistance, high indentation resistance, exceptional surface hardness, and outstanding resistance to organic solvents. They can be molded or extruded into films, fibers, filaments, and other shaped articles. Composites can be prepared using a variety of fillers and reinforcing agents, such as glass filaments, aramide fibers and graphite fibers. The polymers are suitable for specialized uses in a number of engineering-type or electronic applications.

DESCRIPTION OF THE INVENTION

According to the present invention there are provided high molecular weight, essentially linear, thermoplastic amino-s-triazine resins having an inherent viscosity of at least about 0.55 dl./g., measured at 30° C. on a 0.5% by weight solution in 88% aqueous formic acid, said resins comprising recurring units of the formula:

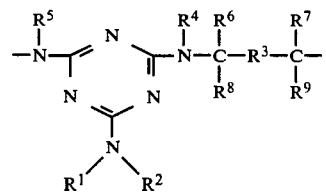

wherein $R^1$ and $R^2$ are independently hydrogen, linear or branched chain $C_1$–$C_6$ alkyl, cycloalkyl of 3–6 carbon atoms, or aryl. Examples of alkyl groups are methyl, ethyl, propyl, isobutyl, hexyl, and the like. The cycloalkyl and aryl groups are optionally substituted with $C_1$–$C_4$ alkyl groups. $R^4$ and $R^5$ are independently hydrogen or $C_1$–$C_4$ alkyl as described above. $R^6$ through $R^9$ inclusive are independently hydrogen or $C_1$–$C_4$ alkyl as described above. $R^3$ is one or more of $C_1$–$C_{30}$ cyclic or linear alkylene, optionally interrupted with —O—, —S—, Si, or other heteroatoms, —(CH$_2$)—$_n$ where n is 0 to 12, $C_6$–$C_{12}$ arylene, or $C_1$–$C_{12}$ alkylidene, said resin containing not less than 25 wt.% of triamino-s-triazine units of the formula:

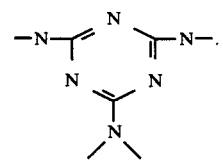

In another aspect, the present invention contemplates a process for the production of high molecular weight essentially linear, thermoplastic amino-s-triazine resins which comprises reacting, in the presence of water, an inert, water-immiscible organic solvent for at least one of the reactants and a basic acid acceptor, substantially equimolar proportions of a triazine compound or a mixture of triazine compounds of the formula:

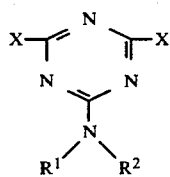

wherein each X is fluorine, chlorine, bromine, or iodine, and $R^1$ and $R^2$ are independently hydrogen, linear or branched chain $C_1$–$C_6$ alkyl, cycloalkyl of 3–6 carbon atoms, or aryl, and said cycloalkyl or aryl groups may be optionally substituted with $C_1$–$C_4$ alkyl, with a diamine or a mixture of diamines of the formula:

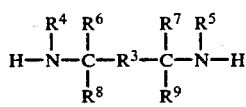

wherein $R^4$ and $R^5$ are independently hydrogen or $C_1$–$C_4$ alkyl as described above. $R^6$ through $R^9$ inclusive are independently hydrogen or $C_1$–$C_4$ alkyl as described above. $R^3$ is one or more of $C_1$–$C_{30}$ cyclic or linear alkylene, optionally interrupted with —O—, —S—, Si, or other heteroatoms, —(CH$_2$)—$_n$ where n is 0 to 12, $C_6$–$C_{12}$ arylene, or $C_1$–$C_{12}$ alkylidene, until a thermoplastic amino-s-triazine resin having an inherent viscosity of at least about 0.55 dl./g., measured at 30° C. on a 0.5% by weight solution in 88% aqueous formic acid is produced.

The reaction is conducted in the presence of a slight molar equivalent excess, over the triazine reactant of a basic acid acceptor and at a temperature in the range of from 50° to about 105° C., preferably about 70° to 100° C. at atmospheric pressure. Superatmospheric pressures or subatmospheric pressures may be used, however, if desired. Examples of said acceptors which may be used include alkali metal or alkaline earth metal hydroxides, carbonates, bicarbonates, and the like. Illustrative are sodium hydroxide, potassium hydroxide, sodium bicarbonate, sodium carbonate, and the like. Carbonates and bicarbonates are preferred. Other known acceptors may also be used without departing from the scope of the instant invention.

The concentration of the triazine starting material in solution can range from about 0.1 to 2.0 molar, while the concentration of the diamine in water is generally substantially in the same range. The molar ratio of triazine to diamine, however, ranges from 1:1 to about 1:1.2 respectively. Lower amounts of diamine materially decrease the yield and molecular weight of the resultant polymer.

The time of contact of the reactants has an effect in determining the molecular weight. Generally, the longer the reaction is allowed to continue, the higher the molecular weight. The reaction time can range from about 5 hours to 200 hours, and preferably from 16 to 72 hours.

Any inert, water-immiscible solvent for the triazine monomer may be used to form the triazine phase of the system. Compounds such as nitrobenzene, toluene, and the like are preferred.

Addition of a catalyst can be used to decrease the reaction time. Small amounts of compounds with a tendency to activate the triazine, such as dioxane, furane, pyridine and the like are preferred.

Any inert emulsifier may be used to facilitate the production of finely divided powdered resin. The addition of such an emulsifier has no significant effect on the reaction time or molecular weight of the polymer. Vigorous agitation may decrease the reaction time. A suitable such emulsifier is a cationic surface-active quaternary ammonium compound. Special mention is made of a 25 wt. % aqueous solution of cetyl dimethyl benzyl ammonium chloride.

Illustrative of triazines which may be used to produce the novel thermoplastic resins are:
2-amino-4,6-dichloro-s-triazine
2-amino-4,6-dibromo-s-triazine
2-amino-4,6-difluoro-s-triazine
2-methylamino-4,6-dichloro-s-triazine
2-methylamino-4,6-dibromo-s-triazine
2-dimethylamino-4,6-dichloro-s-triazine
2-phenylamino-4,6-dichloro-s-triazine
2-tolylamino-4,6-dichloro-s-triazine
2-phenyleneamino-4,6-dichloro-s-triazine
2-diphenylamino-4,6-dichloro-s-triazine
2-dodecylamino-4,6-dichloro-s-triazine,
and the like.

Illustrative of diamines of the above formula useful to produce resins of the present invention are:
1,2-ethanediamine
1,4-butanediamine
1,6-hexanediamine
1,7-heptanediamine
1,8-octanediamine
1,10-decanediamine
1,12-dodecanediamine
p-xylenediamine
m-xylenediamine
o-xylenediamine
N-ethyl ethylenediamine
N,N'-diethylethylenediamine
Bis(aminoethylsulfone)
Bis(aminoethylsulfide)
1,1,4,4-tetramethyl-1,4-butanediamine
1,3-cyclohexanebis(methylamine)
4,7-dioxo-decamethylenediamine,
and the like.

The novel polymers are semi-crystalline solids with molecular weights above 20,000 as determined by Gel Phase Chromotography (GPC) using acrylonitrile as the standard or by light scattering methods. The repeating unit structure has been set forth above.

The polymers are soluble in solvents such as formic acid, sulfuric acid, dimethylsulfoxide, and hydroxyaromatics, such as cresol, etc., and are insoluble in most common organic solvents, such as aliphatic alcohols, ethers, ketones, aldehydes, etc. Once molded, they can be partially crosslinked by further heating. Appropriate cross-linking agents such as formaldehyde, maleic anhydride, etc., may also be used to crosslink the polymer. These crosslinking reactions can be carried out in stages with or without catalysts by properly controlling the heating.

DESCRIPTION OF THE PREFERRED EMBODIMENT

The following examples are set forth for purposes of illustration only and are not to be construed in limitation of the present invention. All parts and percentages are by weight unless otherwise specified.

EXAMPLE 1

Nitrobenzene, 500 parts, was placed in a 1-liter, three-necked indented round-bottomed flask fitted with a mechanical stirrer, a condenser and a thermometer. 2-Amino-4,6-dichloro-s-triazine, 16.5 parts, was dissolved into the nitrobenzene at 85° C. with rapid stirring. After the solution turned clear, a mixture of 12.8 parts of 1,6-hexanediamine, 200 ml. of water, 19.3 parts of sodium bicarbonate, 11.3 ml. of a commercially available surface active agent* and 2 ml. of dioxane catalyst was added. The stirring was continued at 85°–95° C. for 48 hours. After being cooled, the precipitate was collected by filtration. The resin was continuously extracted with acetone for 24 hours and then with methanol for 24 hours. The product was then dried under vacuum at 100° C. for 48 hours. The product (PM6) weighed 19 parts, 90% yield, and had an inherent viscosity of 1.94 dl./g., measured in 88% aqueous formic acid at a concentration of 0.5%. The intrinsic viscosity was 0.92 in dimethylsulfoxide. Infrared (KBR) showed significant peaks at 3400, 2930, 2850 and 810 cm$^{-1}$. Nuclear Magnetic Resonance (TFA-d) values were $\delta$1.60 (s, 8H, CH$_2$), 3.70 (s, 4H, CH$_2$N).

*(Cetyl dimethyl benzyl ammonium chloride (CDMBAC), 25% in water).

EXAMPLE 2

2-Amino-4,6-dichloro-s-triazine, 18.2 parts, was added to 400 parts of nitrobenzene in a 1-liter three necked indented round-bottomed flask at 70° C. A solution of 4.50 parts of 1,12-dodecanediamine in 100 ml. of nitrobenzene and a mixture of 10.6 parts of 1,6-hexanediamine, 19.5 parts of sodium bicarbonate and 11.3 ml. of surface active agent (CDMBAC 25% in water) in 200 ml. of water were simultaneously added to the chlorotriazine solution with rapid stirring. The mixture was stirred at 85° C. for 26 hours. The product was collected then extracted with acetone and then with ethanol for 48 hours. After being dried under vacuum at 110° C. for 48 hours, the product (PM 612) weighed 19 parts, yield 77%, and had an inherent viscosity of 1.00 dl./g., measured in 88% formic acid at 0.5% concentration.

EXAMPLE 3

2-Amino-4,6-dichloro-s-triazine, 18.2 parts, was dissolved in 500 ml. of nitrobenzene at 90° C. m-Xylenediamine, 15.3 parts, and a mixture of 200 ml. of water, 11.3 ml. of the same surface active agent used in Examples 1 and 2 and 19.5 parts of sodium bicarbonate were added simultaneously to the nitrobenzene solution with rapid stirring. The resulting mixture was stirred at 85°–95° C. for 48 hours. After being cooled, the precipitate was collected by filtration. The resin was continuously extracted with acetone then with methanol for 48 hours. The product was dried under vacuum at 90° C. overnight. The product (PMXM) weighed 19 parts, yield 76%, inherent viscosity 1.22 dl./g., measured, in 88% formic acid at 0.5% concentration. Infrared (KBr) peaks were exhibited at 3400, 2930, 2860, 810 and 700 cm$^{-1}$.

EXAMPLE 4

The procedure of Example 1 was repeated, substituting toluene/water for nitrobenzene/water. The polymer was essentially the same as PM6 prepared in Example 1.

EXAMPLES 5–13

Following the procedure of Example 1, several linear polymers are prepared from 2-amino-4,6-dichloro-s-triazine; 2-dimethylamino-4,6-dichlorotriazine and various diamines of the general formula set forth above. The glass transition points (Tg, °C.), inherent viscosities, $\eta$, dl/g., and yield of the polymers (along with those of Examples 1–4, are set forth in Table 1:

TABLE 1

Poly(amino-s-triazine) Resins

| Example | Resin | —CH$_2$—R$^3$—CH$_2$— | $\eta$inh dl./g. | Yield % | Tg, °C. |
|---|---|---|---|---|---|
| 5 | PM4 | —CH$_2$(CH$_2$)$_{\overline{2}}$CH$_2$ | 2.91 | 64 | 110 |
| 6 | PM64(4/1)$^a$ | —CH$_2$(CH$_2$)$_{\overline{6,4}}$CH$_2$— | 2.22 | 69 | 122 |
| 1 | PM6 | —CH$_2$(CH$_2$)$_{\overline{4}}$CH$_2$— | 1.94 | 90 | 120 |
| 4 | PM6 | " | 1.97 | 87 | 117 |
| 3 | PM612(4/1)$^a$ | —CH$_2$(CH$_2$)$_{\overline{4,10}}$CH$_2$— | 1.00 | 77 | 103 |
| 7 | PM7 | —CH$_2$(CH$_2$)$_{\overline{5}}$CH$_2$— | 2.09 | 78 | 106 |
| 8 | PM10 | —CH$_2$(CH$_2$)$_{\overline{8}}$CH$_2$— | 1.72 | 75 | 80 |
| 9 | PM12 | —CH$_2$(CH$_2$)$_{\overline{10}}$CH$_2$— | 0.63 | 72 | 74 |
| 2 | PMXM | 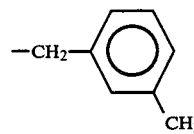 | 1.22 | 76 | 127 |
| 10 | PM6XM(1/1)$^a$ | 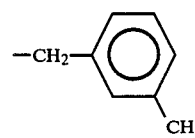 | 1.20 | 78 | 137 |
| 11 | PM6DM$^b$ | —CH(CH$_2$)$_{\overline{4}}$CH$_2$ | 1.09 | 72 | 88 |
| 12 | PM6/DM(9/1)$^c$ | —CH$_2$(CH$_2$)$_{\overline{4}}$CH$_2$— | 1.97 | 44 | 120 |

TABLE 1-continued

| | | Poly(amino-s-triazine) Resins | | | |
|---|---|---|---|---|---|
| Example | Resin | —CH$_2$—R$^3$—CH$_2$— | $\eta$inh dl./g. | Yield % | Tg, °C. |
| 13 | PM6/DM(3/1)$^c$ | —CH$_2$—(CH$_2$)$_4$—CH$_2$ | 2.17 | 48 | 110 |

*With —CH$_2$—(CH$_2$)$_4$—CH$_2$—
$^a$Molar ratio of diamines in the feed.
$^b$A homopolymer derived from 2-dimethylamino-4,6-dichloro-s-triazine.
$^c$Feed ratio of 2-amino-4,6-dichloro-s-triazine and 2-dimethylamino-4,6-dichloro-s-triazine.

EXAMPLES 14–17

New resins as prepared by the procedures of Examples 1–13 above, were compression molded at 150°–230° C. into test specimens, and physically tested. In the first series, four PM6 resins with different molecular weights are tested with the results set forth in Table 2:

TABLE 2

| PHYSICAL PROPERTIES OF PM6 RESINS | | | | |
|---|---|---|---|---|
| Example | 14 | 15 | 16 | 17 |
| Inherent Viscosity (88% HCOOH) | 0.64 | 0.95 | 1.67 | 1.84 |
| (m-cresol) | 0.43 | 0.57 | a | a |
| (H$_2$SO$_4$) | 0.46 | 0.77 | — | — |
| Reduced Viscosity (88% HCOOH) | 0.71 | — | — | — |
| (H$_2$SO$_4$) | 0.52 | 0.94 | — | — |
| Specific Gravity | 1.25 | 1.24 | 1.24 | 1.24 |
| Bierbaum Scratch Hardness | 20.8 | — | 29.6 | 29.6 |
| Rockwell Hardness(M) | 101 ± 4 | 97 ± 8 | 115 | 115 |
| Tensile Strength(MPa) | 38 | — | 52 | 76 ± 6 |
| Tensile Modulus(GPa) | 5.3 | — | 3.0 | 3.7 |
| Elongation at Break(%) | 0.78 | — | 2.5 | 3.0 |
| Flexural Strength(MPa) | 43 | 44 | 96 | 138 |
| Flexural Modulus(GPa) | 4.9 | 4.5 | 3.8 | 3.9 |
| Deflection Temperature under Load (264 psi) (°C.) | 106 | 118 | 141 | 140 |
| Izod Notched Impact Strength (J/m) | — | — | 13 | 21 |
| Oxygen Index | 26-7 | — | — | 26.8 |
| Tg (DTA, °C.) | 106 | — | 120 | 120 | a Only partially soluble

The physical properties become outstanding, as the molecular weight increases, the mechanical and hardness properties being in the generally accepted ranges for engineering thermoplastics.

The new resins prepared according to the foregoing Examples 1–3 and 5–13 were molded and tested with the results set forth in Table 3:

TABLE 3

| | | | | Physical Properties of Linear (Poly amino-s-triazine) Resins | | | | | |
|---|---|---|---|---|---|---|---|---|---|
| | | | Bierbaum | Tensile | | | Flexural | | |
| Example | Resin | Rockwell Hardness (M) | Scratch Hardness | Strength MPa | Modulus GPa | Elongation, % | Strength MPa | Modulus GPa | Izod Impact$^b$ Strength, J/m |
| 5 | PM4 | 125 | 36.3 | 76 | 5.6 | 1.6 | 117 | 5.9 | 14 |
| 6 | PM64 (4/1) | 119 | 31.7 | 63 | 3.8 | 2.2 | 119 | 4.3 | 24 |
| 1 | PM6 | 115$^a$ | 29.6 | 76 ± 6 | 3.7 | 3.0 | 138 | 3.9 | 21$^d$ |
| 3 | PM612 (4/1) | 117 | 28 | 85 | 2.9 | 3.7 | 140 | 3.7 | 27 |
| 7 | PM7 | 115 | 17.6 | 60 | 3.3 | 3.7 | 125 | 3.4 | 26 |
| 8 | PM10 | 101 | 13.6 | 39 | 3.0 | 1.4 | 59 | 2.7 | 13 |
| 9 | PM12 | 38 | 12.3 | 30 | 1.9 | 1.8 | 49 | 2.1 | 12 |
| 2 | PMXM | 124 | 31.7 | 84 | 5.4 | 1.7 | 186 | 6.4 | 14 |
| 10 | PM6XM (1/1) | 123 | 28 | 86 | 4.9 | 2.0 | 117 | 5.6 | 19 |
| 11 | PM6DM | 31 | 16 | 35,64$^c$ | 1.6 | 2.5 | 99 | 2.8 | 10 |
| 12 | PM6/DM (9/1) | 105 | 29.6 | 54 | 3.3 | 2.1 | 143 | 4.3 | 20 |
| 13 | PM6/DM (3/1) | 87 | 17 | 55 | 3.5 | 1.8 | 87 | 3.9 | 15 |

$^a$E88
$^b\frac{1}{8}$ in. Thick Specimens, Izod notched method A
$^c$Injection molded specimens
$^d$Notched reversed, Method E 51 J/m, Tensile Impact Strength 8.6 KJ/m$^2$ Additives such as fillers, dyes, pigments, stabilizers, plasticizers, ultraviolet absorbers, reinforcing fibers and the like may be added to the novel molding resins without departing from the scope of the present invention.

EXAMPLES 18–19

Two reinforced compositions according to the present invention are prepared by blending PM6 of Example 1 with chopped carbon fiber and with aramide fiber, respectively. The compositions employed and the properties obtained after compression molding and testing are set forth in Table 4:

TABLE 4

| Reinforced Poly(alkyleneamino-s-triazine) Resins | | |
|---|---|---|
| Example | 18 | 19 |
| Composition (parts by weight) | | |
| PM6 | 88 | 88 |
| Carbon fiber | 12 | — |
| Aramide fiber | — | 12 |
| Properties | | |
| Specific gravity | 1.27 | 1.26 |
| Molding temperature, °C. | 210 | 210 |
| Scratch hardness, (Bierbaum) | 28 | 28 |
| Rockwell Hardness, (M Scale) | 114 | 114 |
| Tensile strength (MPa) | 81 | 51 |
| Tensile modulus (GPa) | 8.3 | 5.4 |
| Elongation, % | 1.3 | 1.6 |
| Flexural strength (MPa) | 135 | 102 |
| Flexural modulus (GPa) | 7.6 | 4.4 |
| Deflection Temperature Under Load at 264 psi, °C. | 157 | 122 |

TABLE 4-continued

| Reinforced Poly(alkyleneamino-s-triazine) Resins | | |
|---|---|---|
| Example | 18 | 19 |
| Impact Strength (J/m) | 22 | 36 |

Many variations of the present invention will suggest themselves to those skilled in this art in light of the above, detailed description. All such variations are within the full intended scope of the appended claims.

We claim:

1. A process for the production of high molecular weight essentially linear, thermoplastic amino-s-triazine resin which comprises reacting in contact with water, an inert, water-immiscible organic solvent for at least one of dihalo-s-triazine and diamine and a basic acid acceptor, substantially equimolar proportions of a triazine compound or a mixture of triazine compounds of the formula:

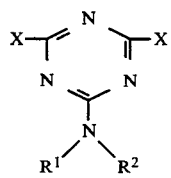

wherein each X is fluorine, chlorine, bromine or iodine, and $R^1$ and $R^2$ are independently hydrogen, linear or branched chain $C_1$-$C_6$ alkyl, cycloalkyl of 3–6 carbon atoms, or aryl, or said cycloalkyl or aryl groups substituted with $C_1$-$C_4$ alkyl groups, with a diamine, or a mixture of diamines of the formula:

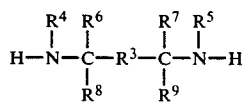

wherein $R^4$ and $R^5$ are independently hydrogen or $C_1$-$C_4$ alkyl; $R^6$ through $R^9$ inclusive are independently $C_1$-$C_4$ alkyl; and $R^3$ is $C_1$-$C_{30}$ cyclic or linear alkylene, or $C_1$-$C_{30}$ cyclic or linear alkylene interrupted with —O—, —S—, or Si, —(CH$_2$)—$_n$ where n is 0 to 12, $C_6$-$C_{12}$ arylene, or $C_1$-$C_{12}$ alkylidene, until a thermoplastic amino-s-triazine resin having an inherent viscosity of at least about 0.55 dl./g., measured at 30° C. on a 0.5% by weight solution in 88% aqueous formic acid, is produced, said resin containing not less than 25 wt. % of triamino-s-triazine units of the formula:

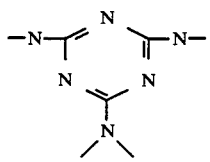

2. A process according to claim 1 wherein the triazine compound is 2-amino-4,6-dichloro-s-triazine.

3. A process according to claim 1 wherein the triazine compound is 2-dimethylamino-4,6-dichloro-s-triazine.

4. A process according to claim 1 wherein the diamine is 1,4-butanediamine.

5. A process according to claim 1 wherein the diamine is 1,6-hexanediamine.

6. A process according to claim 1 wherein the diamine is m-xylenediamine.

7. A process according to claim 1 wherein said basic acid acceptor is selected from the group consisting of alkali metal or alkaline earth metal hydroxides, carbonates, and bicarbonates.

8. A process according to claim 1 wherein said basic acid acceptor is selected from the group consisting of sodium hydroxide, potassium hydroxide, sodium bicarbonate and sodium carbonate.

9. A process according to claim 8 wherein said basic acid acceptor is sodium bicarbonate.

10. A process according to claim 1 which additionally contains a catalyst.

11. A process according to claim 10 wherein said catalyst is selected from the group consisting of dioxane, furane, and pyridine.

12. A process according to claim 1 which additionally contains an inert emulsifier.

13. A process according to claim 12 wherein said emulsifier is a cationic surface-active quaternary ammonium compound.

14. A process according to claim 13 wherein said ammonium compound is a 25 wt. % aqueous solution of cetyl dimethyl benzyl ammonium chloride.

15. A process according to claim 1 wherein said solvent is nitrobenzene or toluene.

16. A process for the production of high molecular weight essentially linear, thermoplastic amino-s-triazine resin which comprises reacting, in contact with water, an inert, water-immiscible organic solvent for at least one of dihalo-s-triazine and diamine, a basic acid acceptor selected from the group consisting of alkali metal or alkaline earth metal hydroxides, carbonates and bicarbonates, and an inert emulsifier, substantially equimolar proportions of a triazine compound or a mixture of triazine compounds of the formula:

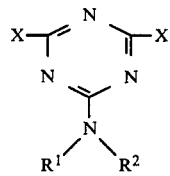

wherein each X is fluorine, chlorine, bromine or iodine, and $R^1$ and $R^2$ are independently hydrogen, linear or branched chain $C_1$-$C_6$ alkyl, cycloalkyl of 3–6 carbon atoms, or aryl, or said cycloalkyl or aryl groups substituted with $C_1$-$C_4$ alkyl groups, with a diamine, or a mixture of diamines of the formula:

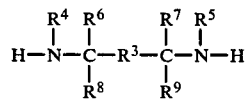

wherein $R^4$ and $R^5$ are independently hydrogen or $C_1$-$C_4$ alkyl; $R^6$ through $R^9$ inclusive are independently $C_1$-$C_4$ alkyl; and $R^3$ is $C_1$-$C_{30}$ cyclic or linear alkylene, or $C_1$-$C_{30}$ cyclic or linear alkylene interrupted with —O—, —S—, or Si, —(CH$_2$)—$_n$ where n is 0 to 12, $C_6$-$C_{12}$ arylene, or $C_1$-$C_{12}$ alkylidene, until a thermoplastic amino-s-triazine resin having an inherent viscosity of at least about 0.55 dl./g., measured at 30° C. on a 0.5% by weight solution in 88% aqueous formic acid, is produced, said resin containing not less than 25 wt. % of triamino-s-triazine units of the formula:

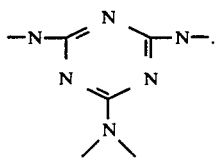

17. A process of claim 16 further comprising a catalyst.

18. A process according to claim 17 wherein the basic acid acceptor is sodium hydroxide, potassium hydroxide, sodium bicarbonate, or sodium carbonate, said catalyst is dioxane, furane, or pyridine, and the emulsifier is a cationic surface-active quaternary ammonium compound.

19. A process according to claim 18 wherein said basic acid acceptor is sodium bicarbonate, said catalyst is dioxane, and said emulsifier is a 25 wt. % aqueous solution of cetyl dimethyl benzyl ammonium chloride.

20. A process according to claim 18 wherein said triazine compound is selected from the group consisting of 2-amino-4,6-dichloro-s-triazine, and 2-dimethylamino-4,6-dichloro-s-triazine.

21. A process according to claim 20 wherein the diamine is selected from the group consisting of 1,4-butanediamine, 1,6-hexanediamine, m-xylenediamine, and 1,12-dodecanediamine.

22. A process according to claim 21 wherein the basic acceptor is sodium bicarbonate, the catalyst is dioxane, and the emulsifier is a 25 wt. % aqueous solution of cetyl dimethyl benzyl ammonium chloride.

23. A process of claim 16 wherein said basic acid acceptor is sodium hydroxide, potassium hydroxide, sodium bicarbonate, or sodium carbonate and said emulsifier is a cationic surface-active quaternary ammonium compound.

24. A process of claim 23 wherein said emulsifier is a 25 wt. % aqueous solution of cetyl dimethyl benzyl ammonium chloride.

* * * * *